Figure 1:
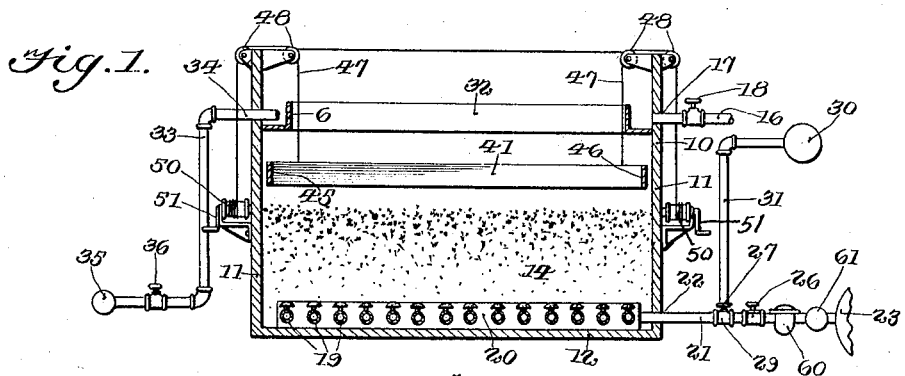

C. A. BROWN.
METHOD OF CLEANSING FILTERS.
APPLICATION FILED FEB. 8, 1918.

1,406,340.

Patented Feb. 14, 1922.

Inventor
Charles Arthur Brown
By F. O. Richey
His Attorney

UNITED STATES PATENT OFFICE.

CHARLES ARTHUR BROWN, OF LORAIN, OHIO.

METHOD OF CLEANSING FILTERS.

1,406,340.   Specification of Letters Patent.   Patented Feb. 14, 1922.

Original application filed August 25, 1916, Serial No. 116,775. Divided and this application filed February 8, 1918. Serial No. 216,103.

*To all whom it may concern:*

Be it known that I, CHARLES A. BROWN, a citizen of the United States, residing at Lorain, in the county of Lorain and State of Ohio, have invented certain new and useful Improvements in Methods of Cleansing Filters; and I do hereby declare the following to be a full, clear, and exact description of the invention, such as will enable others skilled in the art to which it appertains to make and use the same.

My invention relates to improved methods or processes of cleansing filters, such as, for example, sand filters. One of the objects of my invention is to greatly simplify the cleaning of such devices without deterioration thereof.

As is well known, the filter bed is employed as a support for the bridging action of coagulated matter carried by the water to be filtered. The coagulated matter, being coarser than the interstices between the sand particles, bridges the interstices and forms a strainer, much finer than the interstices of the sand bed itself, which retains additional coagulated matter and other impurities. The water passing through this very fine-pored mineral screen is purified thereby and as it is continually bringing additional coagulated matter to said screen, which is deposited therein, the thickness of this very finely porous filtering medium is being constantly increased. With increasing thickness of this layer comes an increasing resistance to the passage of water through it until eventually the resistance becomes too great to be overcome economically. The filter must then be washed and when so washed it is desirable that all or nearly all of the coagulated matter shall be carried away from the filter by the wash water, and it is highly important that if any coagulated matter is not so carried away and remains on the surface of the sand, that it shall be in a very finely divided state, so as to be carried away the next time the filter is washed. The main objection to leaving any of this material in the filter bed after any washing of the bed is found in its tendency to agglomerate into larger masses of such size that they cannot be carried away by the wash water. One of the purposes of my invention is to prevent such agglomerations.

A filter bed is washed by forcing water upward through the sand, which lifts and partially liquefies the sand bed. If the rate of upward flow is sufficient, rakes may be forced through the sand while the bed is washing, but this is objectionable because the cost of installing and maintaining, and of driving the rakes is great.

I am aware also that other methods, such as forcing air upward through the sand or filter beds, either before or during the application of the wash water, have been widely used, but this has not proven entirely satisfactory and is gradually losing favor. Other attempts, such as larger volumes of wash water, have also been made, but have proven expensive in first cost and more or less unsatisfactory. When carelessly used, which often happens, this last named method causes loss of sand and expense to replace it.

Furthermore, the use of very rapid rates in washing tends to lift the sand higher than a low rate. This means the spaces between the sand particles are increased and less attrition between the sand grains is obtained during the wash, and, therefore, there is a less tendency for the sand particles to clean themselves of adhering coagulated matter than where lower rates of washing are employed.

I cause, by action of the wash water, the sand particles to rub against each other and other objects, the dislodging therefrom of coagulated matter and the prevention of agglomeration of such matter.

Another object of my inveinton is to cause each unit of wash water to carry away the largest possible load of impudities caught by the filter while filtering, thus reducing the quantity of wash water required to cleanse the filter and reducing the cost of washing.

This application is a division of my application No. 116,775, filed Aug. 25, 1916.

Other objects of my invention and the invention itself will probably be better understood from a description of an embodiment of mechanism employing the process of my invention.

Figure 2:
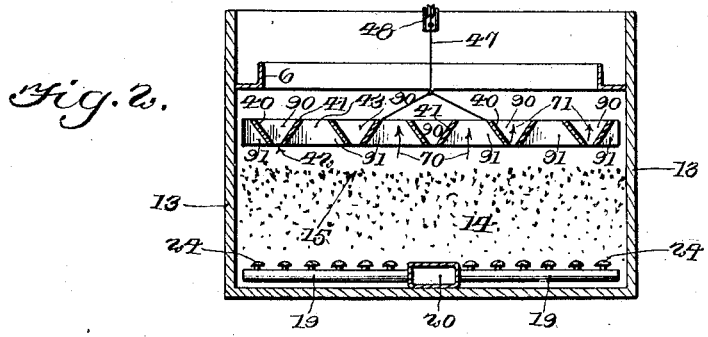
Figure 3:
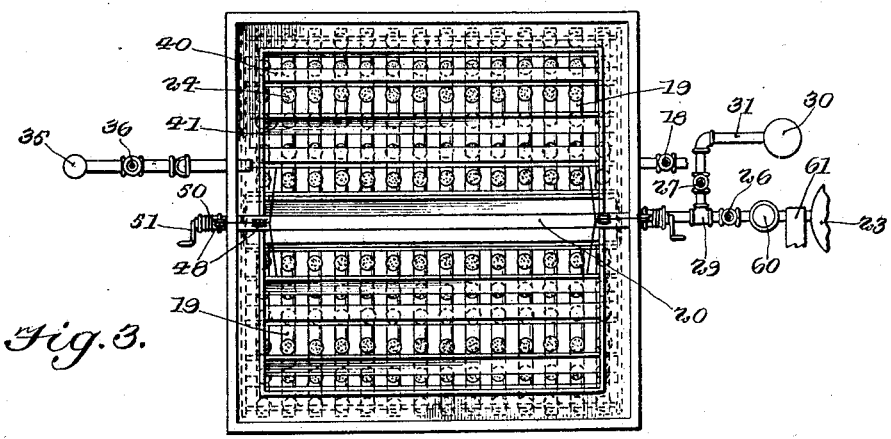

Fig. 1 is a sectional view of an embodiment of my invention. Fig. 2 is a second sectional view taken at right angles to Fig. 1. Fig. 3 is a plan view of the embodiment shown in Figs. 1 and 2.

Referring now to the drawings, and to the apparatus shown therein, the filter is shown at 10, the side walls being illustrated at 11, the bottom at 12 and the ends at 13. While I have shown a rectangular filter, it will be understood that any suitable form or shape of filter may be employed. The sand bed is shown at 14, extending in the embodiment shown from the bottom to the sand line 15. A pipe 16 enters the filter through an opening 17 in the wall of the filter and conveys the water to be filtered into the filter. The flow into the filter is controlled by a valve 18. In the bottom of the filter there are provided manifolds shown at 19, connected to a mother manifold 20, which is connected to a pipe 21 leading through an opening 22 in the wall of the filter and through which the filtered water passes outward to a destination, such as a clear water reservoir, and from which it may be delivered to a distant point or distributed as desired. The water, passing downward through the filter, enters the manifold through the strainer heads shown at 24, which are here shown as mushroom shaped and provided with a plurality of openings in the top.

At 30 is shown a source of wash water under pressure, which may be from a clear water reservoir or a pump. The source 30 is connected by a pipe 31 to the pipe 21 leading to the manifold at the bottom of the filter. A valve 26 is provided between the outlet 23 and the junction 29 of the pipes 31 and 21, and a valve 27 is provided in the pipe 31.

The wash trough is shown at 32. A pipe 33 is shown leading through the wall of the filter into the trough 32, through which the waste water flows to a destination 35, which may be a sewer. A valve 36 is placed in the pipe 33, preferably just outside the wall 11 of the filter.

The sand particles and the impurities caught by the filter are floated and separated by the upward rush of the wash water while washing and are brought together and made to grind against each other and against other objects, whereby any agglomeration of the impurities is prevented or broken up and the sand particles are scoured of adhering impurities. The impurities being thus disintegrated into very small particles are readily carried away to the sewer by the wash water while the sand is thoroughly cleaned and retained in the filter.

In the form shown, this means consists of a plurality of plates, shown at 40 and 41. These plates are inclined to the walls of the filter, the plates 41 being inclined in one direction and the plates 40 in another direction. Each of the plates 40 is so arranged with respect to a plate 41 that a relatively small opening is left at 42 in what might be termed the bottom of a trough formed by each plate 40 and 41. Larger openings 43 are formed between the tops of the adjacent troughs, as shown to good advantage in Fig. 2. The plates are preferably arranged to be raised and lowered in the filter, within certain limits, and in the embodiment illustrated, the ends of the plates are connected through cables 47 over pulleys 48 to some means for raising and lowering them, such as windlasses 50 operated by cranks 51 in a well known manner. While I have shown these as movable by means of the device shown, it must be understood this is only for convenience in adjusting the height above the sand level when filtering. In service they are fixed in one position and maintained in that position immovably and could, if desired, be placed in one position and maintained there with no provision to move them, although this would not be quite as convenient when it was desired to get at and inspect the sand bed. A filter controller is shown diagrammatically at 60 and a clear water reservoir at 61.

The operation of the apparatus shown in the drawings is as follows: When it is desired to filter water, the valves 36 and 27 are closed and the valves 18 and 26 opened. The water to be filtered flows in through the pipe 16, the water level in the filter being maintained at or about a definite level, passes downwardly to the surface of the sand between the plates through the openings 42 and 43. Owing to the arrangement of the plates most of the flow will pass through the openings 43, while a considerable volume of water in a more quiet state will always be over each pair 40 and 41 of plates. The quiet or semi-quiet condition of this water will have a tendency to cause sedimentation on the top side of each of the plates 40 and 41, and, therefore, may cause the troughs formed by each pair 40 and 41 of plates to become partially or even completely filled with coagulated matter, if the quantity of coagulated matter in the water to be filtered is very large.

The amount of this coagulated matter caught and retained in the troughs prevents this quantity of coagulated matter from reaching the sand bed and has a tendency to permit the filter to be operated longer without washing than would be the case without this action.

The coagulated water to be filtered which passes through the openings 43, together with the coagulation carried with it will pass through the screen of filtering matter deposited on the sand, then downward through the sand, leaving its load of coagulation to increase the thickness and resistance of the filtering layer.

Gradually the resistance to the passage of water through the filtering layer increases and the time comes when the filter bed must be washed; that is, the impurities caught by the sand must be removed from the filter. The valves 18 and 26 are then closed and the valves 27 and 36 opened. Wash water from the source 30 flows through the duct 31 through the manifolds and up through the sand bed over the side 6 of the wash trough into the wash trough 32 and out through the duct 33. Under this upward rush of wash water the sand bed lifts and liquefies in a well known manner. This, unaided, will carry away many of the impurities if they be in a very finely divided state, but if they be agglomerated into masses of considerable size, the washing is imperfectly done and the masses of impurities thus agglomerated will remain in the filter, causing trouble in many ways.

Many of the impurities are such as to agglomerate into masses of considerable size and have caused trouble at many points. When first formed, they are quite small, sometimes not much over one-sixteenth of an inch in diameter. By accretion they may grow to larger masses, known commonly as mud balls, of irregular shape, sometimes measuring an inch or more in their major diameter. Although readily broken up in the first stages, they become more resistive as they grow in size.

The wash water lifting and liquefying the sand bed carries these mud balls with it, but not sufficiently high to allow the mud balls to enter the wash trough and be removed, or if this does occur, a great deal of sand is carried away along with the mud balls and wasted.

In the embodiment illustrated the lifting of the sand bed and the mud balls therewith causes both the sand and the mud balls to be lifted above the top of each pair of plates 40 and 41, the major portion at the start rising through the contracting passages 91 terminating at 43. Owing to the narrowing of the passages 43, the velocity of the liquid flowing through these passages will actually be increased, so that the sand particles will be carried higher than would happen were these plates not placed in the course of the wash water.

The flow upward through 42 and the expanding passages 90 communicating therewith being small, the velocity of upward flow at the top and inside of such expanding passages 90 is small; in fact, the water is practically quiescent. The sand spreading from the upward flow through the openings 43 spills into the quiet water in the troughs, which has insufficient velocity of flow to support it therein; consequently, it falls into the passages 90 and passes downward through the opening 42 back to be again caught by the upward flow and lifted through the passages 91 and through the cycle again. The opening 42 may be restricted so as to offer some resistance to the volume of sand tending to pass downward.

The trough within a few seconds then becomes loaded, sand being heaped above the top of the troughs in the center and working back through the opening 42 to be again caught and lifted into the trough. The grinding of the sand particles against each other and the sides of the plates results in an action of the sand with and against any mud balls of any size, and this action is sufficient to disintegrate such agglomerations and also to cleanse the sand very thoroughly. The disintegration of the mud balls into exceedingly small particles enables the wash water at proper velocities to lift and carry these upward to the top of and into the wash troughs and from there they are carried to the sewer and away from the filter. In doing this, the rate of washing can be made so low as to keep any of the sand from wasting.

The breaking up of these agglomerations of impurities enables the efficiency of the wash water to be largely increased, and, therefore, decreases the cost of cleaning the filter, as well as increasing its efficiency as a filter.

I prefer to arrange the plates at an angle greater than the angle of repose of the filter sand in water, so when the wash water is shut off, all the sand in the troughs will return to the filter bed. I also prefer to use the form of attrition members consisting of plates 40 and 41 which I have illustrated. The rubbing or attrition effect of the particles may, of course, be varied by changing the velocity of the wash water.

It will be understood that I have described this mechanism and its operation for the purpose of better explaining my invention, which may, as will readily be seen, be employed to cleanse filter beds of other construction than that illustrated here. Nor is my invention limited to the particular details of the method here described, since variations may be made therefrom, within the scope of the claims, without departing from the spirit of the invention.

I claim:—

1. The method of cleansing a filter bed, which consists in forcing through the bed a wash liquid under conditions under which it bears upward with it the particles of impurities and the particles composing the filter bed, increasing and decreasing respectively the velocities of adjacent and parallel columns of the liquid as it passes through the filter and thereby causing said particles to grind against each other disintegrating agglomerated particles of impurities and dislodging particles of impurities from the particles composing the filter bed, causing said particles composing the filter bed to settle again to the bottom of the filter bed and washing away the particles of impurities thus dislodged and disintegrated.

2. The method of cleansing particles of a filter bed, which consists in forcing wash water upwardly through said bed at a velocity sufficient to carry said particles upwardly with it, providing two passages for said water carrying said particles, increasing the velocity of the water carrying said particles in one of said passages, subsequently decreasing the upward velocity of said water so that it is no longer capable of carrying said particles, so that the particles fall back through the other passage, in which the velocity of the water has not been increased, towards the normal position of said particles, and thereby causing an abrasion of said particles as they so return and dislodging through said abrasion the impurities from said particles.

3. The method of cleansing a filter bed composed of a plurality of particles, which consists in forcing through said bed a wash fluid at a velocity great enough to carry upward the particles of the bed and the impurities associated therewith, further increasing the velocity of a portion of said fluid carrying said particles, not increasing the velocity of a second portion of said fluid, parallel with the portion whose velocity has been increased, later reducing the velocity of that portion of the fluid whose velocity was increased so that it no longer carries such filter bed particles which are thereby caused to return towards their normal position through that portion of the fluid whose velocity was not increased, thereby causing the particles to rub together, disintegrating the agglomerations of impurities and dislodging impurities from the particles in the filter bed, carrying said impurities thus dislodged and disintegrated from the filter bed by the wash fluid and returning the particles of the filter bed to normal position.

4. The process of cleansing filter beds, which consists in passing the wash water into a chamber through converging and diverging passages alternately positioned with respect to each other, whereby water passing through the converging passages carries along the filtering material and deposits it in the diverging passages.

In witness whereof, I have hereunto signed my name this 4th day of February, 1918.

CHARLES ARTHUR BROWN.